United States Patent [19]

Vogel

[11] Patent Number: 4,828,509
[45] Date of Patent: May 9, 1989

[54] SEALED HOUSING SYSTEM FOR MODULAR TYPE CONNECTORS

[75] Inventor: Gregory G. Vogel, Londonderry, N.H.

[73] Assignee: Hewlett-Packard Company, Palo Alto, Calif.

[21] Appl. No.: 114,279

[22] Filed: Oct. 27, 1987

[51] Int. Cl.$^4$ .......................................... H01R 13/52
[52] U.S. Cl. ..................... 439/278; 439/198; 439/281; 439/587
[58] Field of Search .............. 439/131, 190–191, 439/194, 198, 278, 281–283, 587–589, 592

[56] References Cited

U.S. PATENT DOCUMENTS

| | | | |
|---|---|---|---|
| 3,601,761 | 8/1971 | Harris | 439/587 |
| 3,953,099 | 4/1976 | Wilson | 439/281 |
| 3,998,515 | 12/1976 | Panek | 439/198 |
| 4,498,719 | 2/1985 | Juris et al. | 439/278 |
| 4,693,540 | 9/1987 | Cane | 439/198 |
| 4,709,123 | 11/1987 | Yamashita et al. | 439/282 |
| 4,711,509 | 12/1987 | Cross et al. | 439/587 |

Primary Examiner—Paula A. Austin Bradley
Attorney, Agent, or Firm—Richard F. Schuette

[57] ABSTRACT

A modular connector including mating male and female components providing electrical and pressure connection between the two components. The electrical connections comprise a telephone-type connector retained within molded apertures which also provide for a fluid flow between the mating components. The connector housing includes redundant molded sealing elements, disposed on surfaces of the male component of differing dimensions. The connector also features an overlapping member of one of the connector components providing an umbrella-like shield of the confronting surfaces to provide an environmentally resistant, reliable pressure tight seal.

4 Claims, 2 Drawing Sheets

SEALED HOUSING SYSTEM FOR MODULAR TYPE CONNECTORS

FIELD OF THE INVENTION

The present invention relates to connectors and, in particular, connectors providing a communication of electrical signals and gas pressure between the two sections thereof.

BACKGROUND OF THE INVENTION

Frequently medical equipment requires interconnection of detachable elements having both electrical and pressure connections. Merely joining two different electrical and pressure connectors in a side-by-side arrangement makes the connector sensitive to insertion alignment and lateral spacing of the connectors, resulting in an expensive and complex connector.

Moreover, connectors providing communication of changes in pressure require a sealed housing which provides the necessary pressure coupling. Typically, in sealing two coaxially mating elements, one or more O-rings of the same diameter are employed. However, identical O-rings disposed on the same surface (i.e., of the same radius) may not provide a reliable gas-tight seal, as the singular mating surface is easily damaged, thus compromising the seal. Therefore, a connector thusly constructed is more likely to fail in usage.

Furthermore, modular connectors in medical usage are likely to be exposed to liquids. Normal connectors providing external mechanical attachments have exposed or unprotected confronting surfaces which do not provide the necessary environment resistance for the mating portions of the connectors. Supplemental shields applied around the connector are awkward to use and, as a result, frequently not used.

SUMMARY OF THE INVENTION

The unitary connector according to the present invention provides both an electrical connection and communication of a pressure gradient in a single connector. The mating portions of the electrical connector are retained within a sealed environment within male and femal connector components which allows the pressure gradient to be communicated between the two connector components of the same apertures through which the electrical connector mates. In one embodiment, such pressure changes are communicated from the connector to the equipment by the interstitial space surrounding the electrical connector portions within the connector and to the equipment within the outer covering of the connecting wire. Redundant sealing is provided between the two mating connector components provided by molded O-ring-type seals disposed on the mating surfaces of the connector having different dimension, to provide a seal that is resistant to damage.

The unitary connector according to the present invention also includes a molded-in umbrella-type shield to deflect liquids around the confronting portion of the connector components when fully seated. Thus, the present invention provides a reliable, inexpensive unitary modular connector resistant to wear and environmental damage.

BRIEF DESCRIPTION OF THE DRAWING

These and further features of the present invention will be better understood by reading the following detailed description, taken together with the drawing wherein.

DETAILED DESCRIPTION OF THE DRAWING

Figure 1:
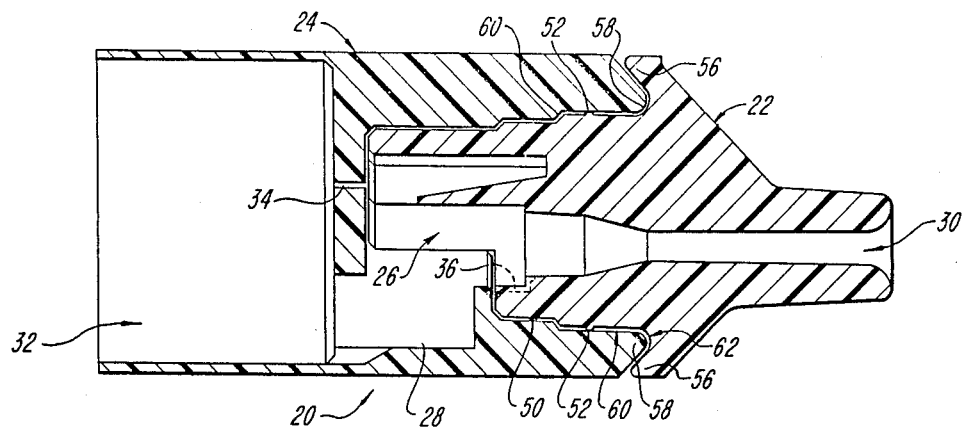
FIG. 1 is a cross section of one embodiment of the two components of the present invention in a mated position.
Figure 3:
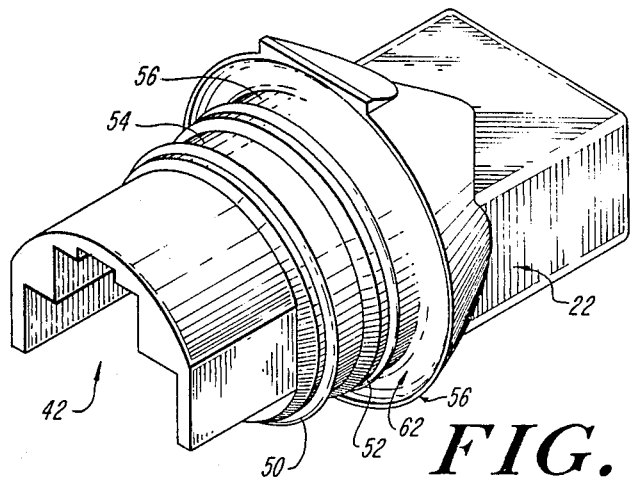
FIG. 3 is an isometric view of the male component of one embodiment of the connector showing the stepped sealing rings.

The connector 20 shown in FIG. 1 includes a male component 22 and a female component 24 having recesses 26 and 28, respectively, formed therein to receive the mating electrical connectors 40 and 44, discussed below and shown in FIG. 2. The aperture 26 is extended to the distal end of the connector 30 to receive a cable (not shown) therein and formed to provide a pressure-tight seal to the external surface of the cable. Similarly, the recess 28 is connected to an enlarged opening 32 which receives the mating connector of FIG. 2 therein and permits equipment or cable connection to the connector component 24. A difference in pressure is communicated between the two sections 22 and 24 via pressure relief openings 34 and 36, molded in the respective connector portions. Therefore, the pressure present in one connector component is equalized to the pressure in the mating connecting component.

Figure 2:
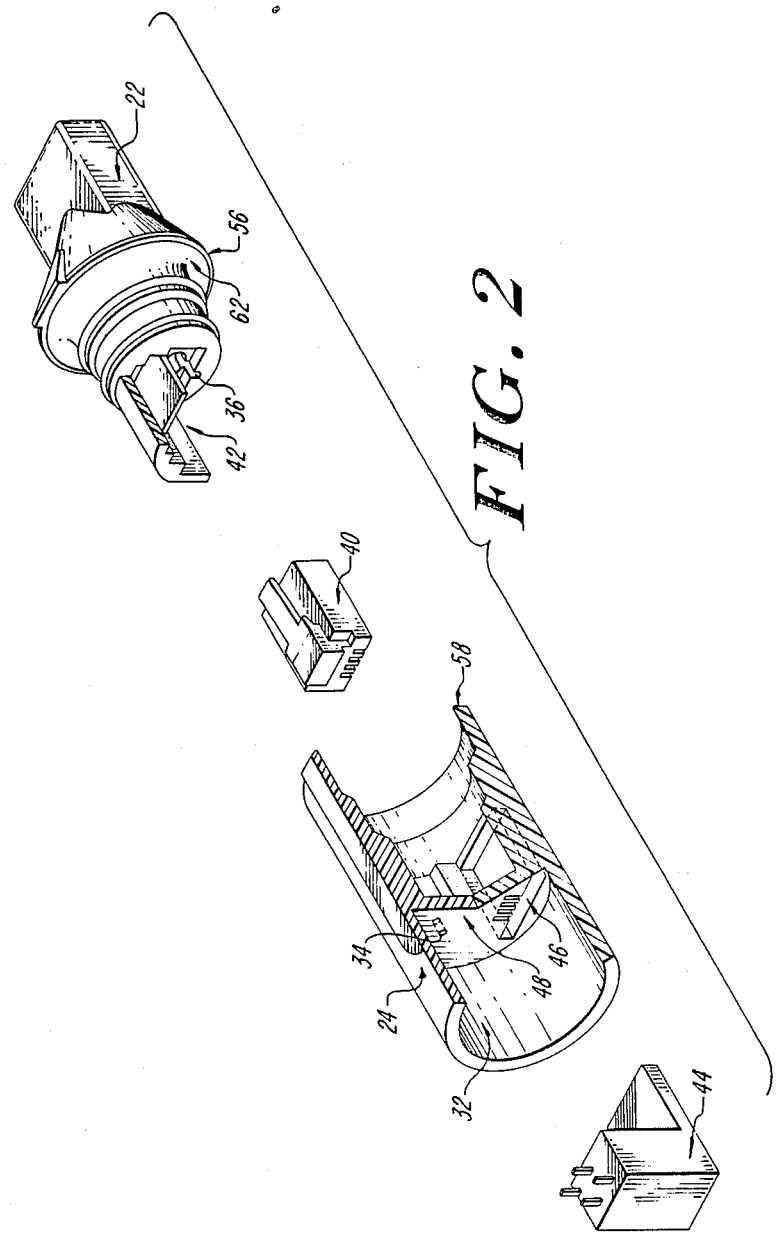
FIG. 2 is an exploded view of the connector elements according to one embodiment of the present invention.

An exploded view of the connector 20 is shown in FIG. 2 wherein the male component 22 of the connector 20 is shown in partial cut-away wherein one portion 40 of the electrical connector is received in the complementary opening 42 of the connector component 22. The electrical connector portion 40, as well as the mating electrical connector portion 44, typically comprise part numbers 940-SP-3046 and 6446-R/CL/CS, manufactured by Stewart Stamping Company, Yonkers, N.Y.

The electrical connector portion 44 is received in the female component 24 of the connector according to the present invention through the opening 32 and an aperture 46 through an internal wall 48 of the connector portion 24. The internal wall 48 has the aperture 34 integrally molded therein to allow the pressure on either side of the wall 48 to equalize. The receiving end of the connector 24 communicates with the opening 42 and opening 36 of the male connector component 22, which communicates with the cable opening (30 of FIG. 1) so that the pressure at the opening 32 becomes equal to the pressure at the rear opening 30 of the male connector component 22. Alternate embodiments of the present invention provide for fluid communication through the apertures which receive the electrical connector portions 40 and 44 and, in the further alternative, through the electrical connector portions 40 and 44.

An additional feature of the connector 20 of the present invention is the multiple seals 50 and 52 on the mating surface of the male component 22 of the connector 20 which engages the opening of the female component 24 to provide a reliable, gas-tight seal. The seals 50 and 52 resemble O-ring elements and are disposed on stepped mating surfaces 54 and 56 of the connector component 22. The seals 50 and 52 are molded as part of the connector element 22. The seals 50 and 52 mate with different surfaces in the female component providing redundant sealing surfaces should one of the sealing surfaces be damaged.

The connector 20 according to the present invention further provides an integral umbrella-like cover 56 as part of the male component 22, to surround a lip 58 of the female component 24 extending toward the mating component 22 having a cavity 62 formed therein. The outer edge of the confronting surfaces of the mating components 22 and 24 are non-orthogonal to the outer surfaces of the connector 20, preferably being disposed at 45°. When the mating components 22 and 24 are fully seated, externally applied liquids are deflected away from the space 60 between the components 22 and 24.

The present invention is not limited to the embodiments and connector types shown. Any substitutions or alterations made by one of ordinary skill in the art are considered to be in the scope of the present application, which is not to be limited except by the claims which follow:

What is claimed is:

1. A modular connector comprising:
   a first connector component having an aperture including a first portion of an electrical connector retained therein; and
   a second connector component having an aperture and receiving a second electrical connector portion therein, wherein
   said second connector component is received by said first connection component and forms a pressure seal with said first connector component,
   said first and second electrical portions are engaged when the first and second connectors are seated, and wherein
   said apertures of said first and second connector components are disposed to communicate a pressure therebetween.

2. The modular connector of claim 1 further including double seal means for providing a gas-tight pressure seal between said first and second connector components.

3. A modular connector comprising:
   a female component including an aperture comprising a plurality of longitudinal portions having successively decreasing relative dimension; and
   a male component received by said female component, including a portion received by said female component and comprising a plurality of longitudinal portions having successively increasing relative dimension, each longitudinal portion including a surrounding outwardly protruding seal for providing a pressure seal with said aperture in said female component when inserted therein;
   wherein said female and male components have apertures which communicate a pressure therebetween.

4. A modular connector comprising:
   a female component including an aperture comprising a plurality of longitudinal portions having successively decreasing relative dimension; and
   a male component received by said female component, including a portion received by said female component and comprising a plurality of longitudinal portions having successively increasing relative dimension, each longitudinal portion including a surrounding outwardly protruding seal for providing a pressure seal with said aperture in said female component when inserted therein;
   wherein one of said components further includes a portion forming a cavity at the mating surface opening toward the mating component, and wherein the other said component includes a protrusion extending toward the mating said component to be received within said cavity for providing an environmental resistant connection when the respective components are fully mated, wherein the outward confronting surfaces of the mating components are non-perpendicular to the outer surface of the component.

* * * * *